United States Patent [19]

Funada et al.

[11] 4,375,317
[45] Mar. 1, 1983

[54] MULTI-LAYERED LIQUID CRYSTAL DISPLAY PANEL

[75] Inventors: Fumiaki Funada, Yamatokoriyama; Keisaku Nonomura, Nara; Hisashi Uede, Yamatokoriyama; Tomio Wada, Nara, all of Japan

[73] Assignee: Sharp Kabushiki Kaisha, Osaka, Japan

[21] Appl. No.: 94,549

[22] Filed: Nov. 15, 1979

[30] Foreign Application Priority Data

| Nov. 16, 1978 | [JP] | Japan | 53-141982 |
| Feb. 16, 1979 | [JP] | Japan | 54-17521 |
| Apr. 3, 1979 | [JP] | Japan | 54-40646 |

[51] Int. Cl.³ .................................................. G02F 1/133
[52] U.S. Cl. .................................. 350/335; 350/334; 350/333; 350/336
[58] Field of Search .......................... 350/335, 334

[56] References Cited

U.S. PATENT DOCUMENTS

| 3,941,454 | 3/1976 | Maezawa | 350/334 |
| 4,084,884 | 4/1978 | Raynes | 350/334 |
| 4,231,639 | 11/1980 | Banda | 350/334 X |
| 4,232,947 | 11/1980 | Funada et al. | 350/341 |
| 4,335,936 | 6/1982 | Nonomura et al. | 350/335 |

OTHER PUBLICATIONS

Funada et al., "Some Characteristics in Twisted Nematic Field Effet Liquid Crystal Displays", *Applied Physics*, vol. 44, No. 866, 1975.

*Primary Examiner*—John K. Corbin
*Assistant Examiner*—David Lewis
*Attorney, Agent, or Firm*—Birch, Stewart, Kolasch and Birch

[57] ABSTRACT

A multi-layered liquid crystal display device has a stack of liquid crystal layers. Each of the liquid crystal layers is disposed in such an orientation vector between each pair of plates as to bring its good display contrast area following the conversion of the molecular alignment into agreement with each other with regard to a whole display area.

5 Claims, 17 Drawing Figures

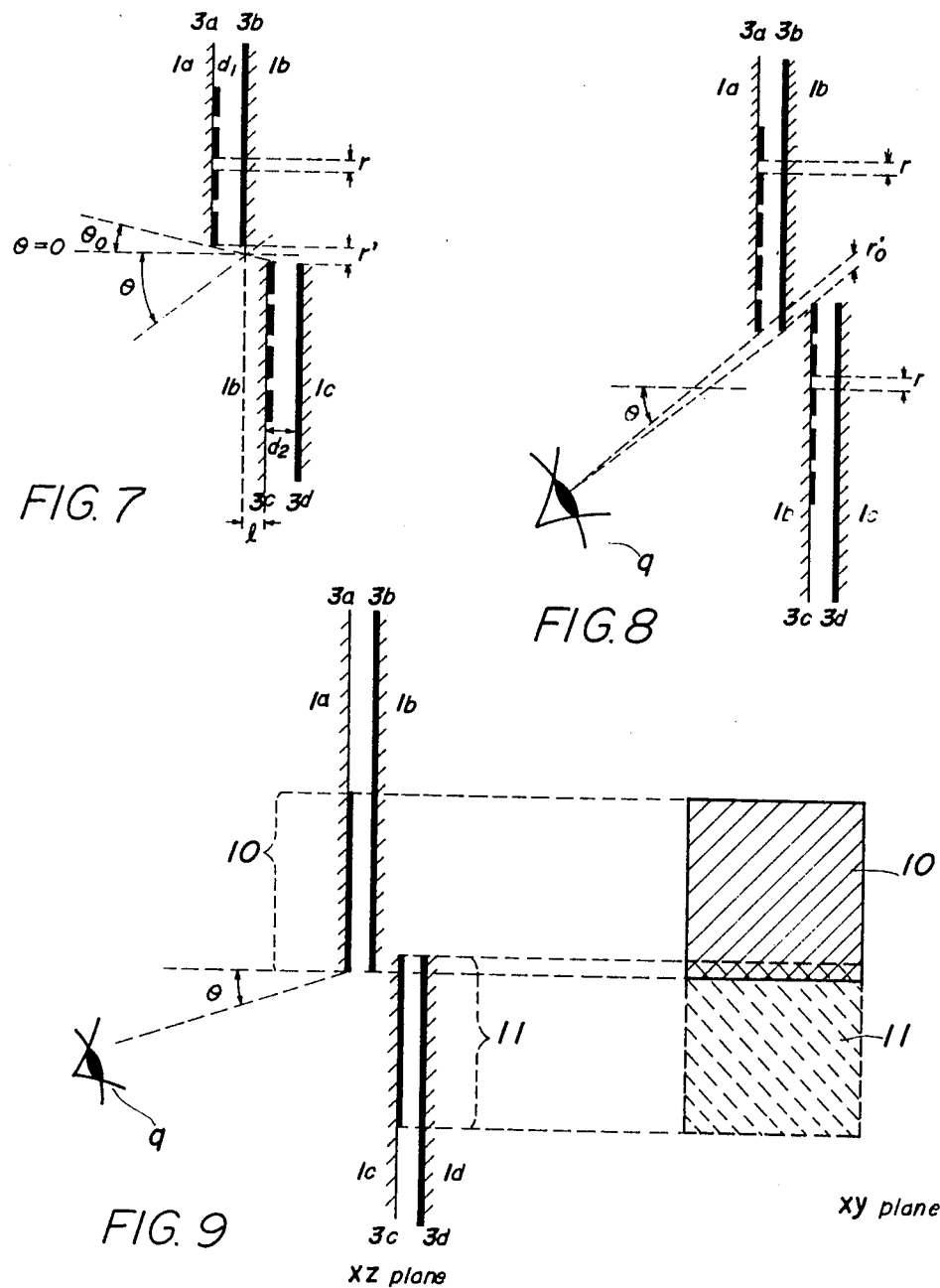

MULTI-LAYERED LIQUID CRYSTAL DISPLAY PANEL

BACKGROUND OF THE INVENTION

This invention relates to a multi-layered twisted nematic liquid crystal display panel wherein a plurality of layers of liquid crystal cells are disposed each having a so-called twisted nematic liquid crystal composition between a pair of plates with its spiral axis normal to the plates and its longitudinal axes of the liquid crystal molecules twisted approximately 90° in relation to the plates.

As is well known in the art, a twisted nematic liquid crystal display manifests a strong anisotropy and hence a viewing angle dependency in display contrast when being supplied with an effective voltage of an amplitude less than a three-fold value of the threshold level of its optical effects (cf. "Some Characteristics in Twisted Nematic Field Effect Liquid Crystal Displays" by Funada, Uede, Wada and Mito, Applied Physics, 44, 866, 1975). The viewing angle dependency is governed by the twisting direction (chirality) of liquid crystal molecules and the tilting direction (tilt angle) of the liquid crystal molecules with respect to a surface of a substrate. The liquid crystal molecules, therefore, bear the same chirality and tilt angle within a common liquid crystal cell, bringing a highest contrast area into agreement with the viewer's direction of observing the liquid crystal cell. This is of a significant importance in minufacturing twisted nematic liquid crystal cells with high quality of display (cf. Japanese unexamined patent publication No. 51/4996). As disclosed in Japanese unexamined patent publication No. 50/794, a multi-layered twisted nematic liquid crystal display panel has been proposed in which such twisted nematic liquid crystal cells are built in a multi-layer fashion and an electrode structure is made to apply partially an electric field to respective ones of liquid crystal layers in the cells as well as a built-in drive circuit for applying desired voltage levels to respective electrodes in the cells. This multilayered twisted nematic liquid crystal display panel is advantageous over a single layer panel as follows:

(1) Diverse displays are possible;
(2) Electro-optical logic circuits can be formed; and
(3) The number of picture elements can increase by an increase in the number of the cells when the length of time (duty factor) where a voltage is applied to respective picture elements is fixed in driving the panel in a multiplexing manner. Nevertheless, the display panel is difficult to reduce to practice primarily because of deterioration of display quality.

OBJECTS AND SUMMARY OF THE INVENTION

It is therefore an object of the present invention to provide a new and useful display panel with a multiplicity of twisted nematic liquid crystal cells which is absent of any deterioration of display performances.

According to the present invention, a multi-layered liquid crystal display device comprises a stack of liquid crystal layers in which the longitudinal axes of the liquid crystal molecules extend spirally, said liquid crystal layers being disposed in parallel with the spiral axes, a voltage supply means for supplying a voltage to at least a portion of said liquid crystal layers for conversion of the molecular alignment and a polarizer means for making visible the conversion of the molecular alignment. Each of the liquid crystal layers is disposed in an orientation vector between each pair of plates so as to bring its good display contrast area following the conversion of the molecular alignment into agreement with each other pair of plates with regard to a whole display area.

BRIEF DESCRIPTION OF THE DRAWINGS

For a more complete understanding of the present invention and for further objects and advantages thereof, reference is now made to the following description taken in conjunction with the accompanying drawings, in which:

FIGS. 6 and 7 are explanation diagrams of the display operation of the liquid crystal display device of FIG. 1;

FIG. 8 is a schematic diagram of another preferred embodiment of the present invention; and FIG. 9 is a schematic diagram of still another preferred embodiment of the present invention.

DETAILED DESCRIPTION OF THE INVENTION

Figure 1:
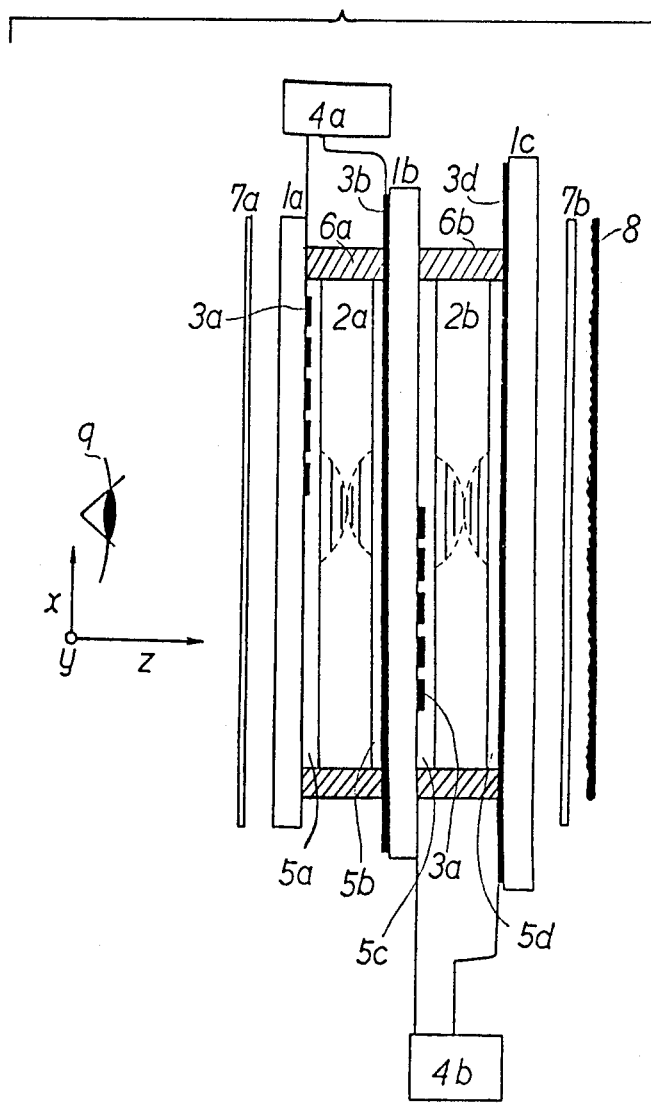
FIG. 1 is a cross sectional view of construction of a two-layer liquid crystal display device.

Referring now to FIG. 1, there is illustrated a construction of a two-layer twisted nematic liquid crystal display panel. Three transparent plates 1a, 1b and 1c of glass, etc., are disposed vis-a-vis and nematic liquid crystal layers (or cholesteric liquid crystal layers with a long pitch) 2a and 2b are intervened between the spacings between the respective transparent plates 1a, 1b and 1c. In order to apply an enabling voltage to the liquid crystal layers 2a and 2b, the transparent plates 1a, 1b and 1c are coated with transparent electrodes 3a, 3b, 3c and 3d of $In_2O_3$, etc., respectively. Electrodes 3a and 3b are connected to a voltage source 4a to drive the liquid crystal layer 2a and the electrodes 3c and 3d are connected to a voltage source 4b to drive the liquid crystal layer 2b. The surfaces of the transparent electrodes 3a, 3b, 3c and 3d and the transparent plates 1a, 1b and 1c facing against the liquid crystal layers are coated with alignment layers 5a, 5b, 5c and 5d after being subjected to alignment treatment such as rubbing or slant evaporation for determining the direction of alignment of the liquid crystal molecules. The transparent plates 1a, 1b and 1c are sealed at their peripheral edges by means of a proper sealant such as epoxy resin and frit glass. Linear polarizer filters 7a and 7b or iodine systems, polyene dye systems, etc., are disposed outside the transparent plates 1a and 1c. A scattering reflective plate 8 is provided at the back of the liquid crystal panel. The polarizer filters 7a and 7b make visible the display upon the conversion of the direction of the molecular alignment. By applying a voltage to the transparent electrodes a visual display is provided for the viewer through optical effects caused by the conversion of the direction of the molecular alignment in the liquid crystal layers 2a and 2b.

Figure 2A:
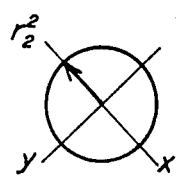
FIGS. 2(A) through 2(E) are diagrams showing alignment of liquid crystal molecules for explanation of the present invention.
Figure 2B:
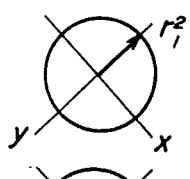
Figure 2C:
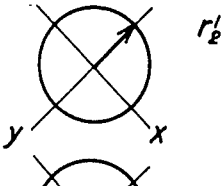
Figure 2D:
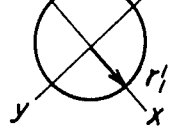
Figure 2E:
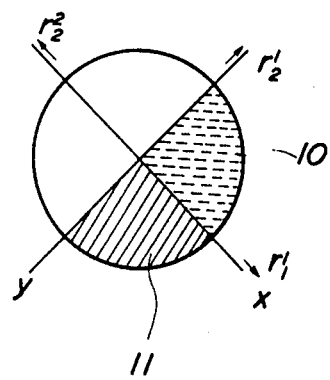

FIGS. 2(A) through 2(E) depict the molecular alignment on the alignment layers 5a, 5b, 5c and 5d and the whole of the liquid crystal panel, wherein FIGS. 2(A) and 2(B) show the orientation vectors of the liquid crystal layer 2a. FIGS. 2(A) depicts the molecular alignment on the alignment layer 5a and FIG. 2(B) depicts that on the alignment layer 5b. It should be noted that the twisting direction is left-handed or counterclockwise. FIGS. 2(C) and 2(D) show the orientation vectors of the liquid crystal layer 2b wherein FIG. 2(C) depicts the molecular alignment on the alignment layer 5c and FIG. 2(D) depicts that on the alignment layer 5d. Note that the twisting direction is left-handed. In the drawings $r_2^2$, $r_1^2$, $r_2^1$, and $r_1^1$ represent the orientation vector of the liquid crystal molecules.

Figure 3:
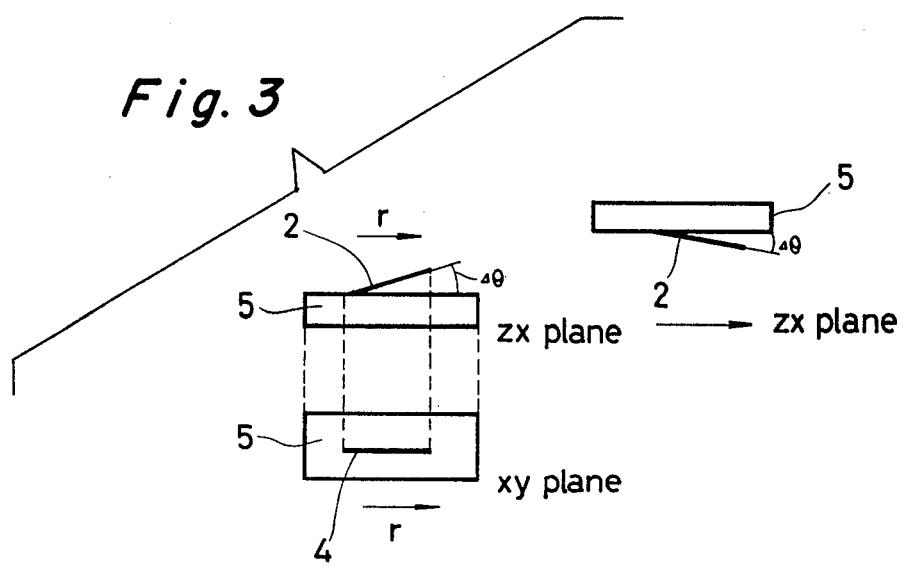
FIG. 3 is an explanation diagram for definition of a vector r indicative of alignment of liquid crystal molecules.

FIG. 3 is an explanation diagram of a tilt angle of the liquid crystal molecules. As is obvious from FIG. 3, r represents the direction where the liquid crystal layers 2a and 2b have a tilt angle $\Delta\theta$ with respect to the transparent plates 3a, 3b, 3c and 3d.

In the case where the liquid crystal layers 2a and 2b show the molecular alignment as shown in FIG. 2, the upper and lower liquid crystal cells have areas where the viewing direction is different and thus provide no uniform display contrast for the viewer's eye with the resulting deterioration of display quality when an electric field is applied to the overall display area. In other words, as indicated in FIG. 2(E), the liquid crystal layer 2a shows a good display contrast in the region 10 defined by the dotted lines and the liquid crystal layer 2b a good display contrast in the region 11 defined by the hatch lines so that both the good display contrast areas afforded by the liquid crystal layers 2a and 2b disagree. This presents a severe problem with the display performances of the multi-layered liquid crystal display panel.

According to one aspect of the present invention, the orientation vectors of the respective liquid crystal layers are periodic and symmetric with respect to the spiral axis to place all the good contrast regions of the respective liquid crystal layers into agreement. FIGS. 4(A) through 4(E) depict the orientation vectors of the liquid crystal molecules in the two-layered structure liquid crystal display panel according to one embodiment of the present invention.

The structure of the two-layered liquid crystal display panel is similar to that as shown in FIG. 1. The transparent plates 1a, 1b and 1c are made from soda glass of 0.7 mm-3 mm thick. The transparent electrodes 3a, 3b, 3c and 3d are patterned by means of etching, etc. and made from $In_2O_3$. The alignment layers 5a, 5b, 5c and 5d are made in a thin film by electron beam deposition of $SiO_2$ and then rubbed in a specific direction with cloth, etc. The liquid crystal layers 2a and 2b are approximately 7μm thick and include a biphenyl liquid crystal (ROTN 403 by Roche) containing a slight amount of cholesteryl nonanoate. It is desirable that the liquid crystal layers 2a and 2b comprise the same liquid crystal material and have the same thickness, in which case the second layer compensates for an elliptical polarization component occurring within the first layer. This provided a high contrast for the multi-layered liquid crystal panel without any interfering color in a background.

From the results of the inventors' experiments it is desirable that the thicknesses di and dj of the liquid crystal layers be within the range of:

$$0.7 \leq dj/di \leq 1.4$$

In other words, di and dj are preferably between 5μm and 10μm.

Figure 4E:
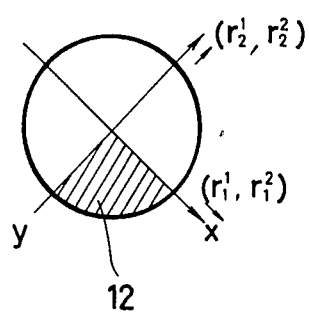
FIGS. 4(A) through 4(E) are diagrams showing alignment of liquid crystal molecules in one preferred embodiment of the present invention.
Figure 4A:
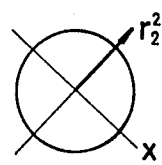
Figure 4B:
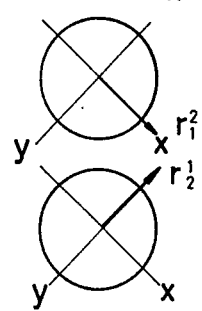
Figure 4C:
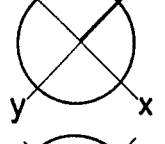
Figure 4D:
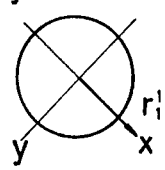

The sealants 6a and 6b are of epoxy resin useful for screen printing. The polarizer filters 7a and 7b are typically L-83-18 marketed by Sanritsu Electric Co. The scattering reflection plate 8 is an aluminium plate subject to sandblast. FIGS. 4(A) and 4(B) show the orientation vectors of the liquid crystal layer 2a wherein the alignment layer 5a has a vector $r_2^2$ and the alignment layer 5b has a vector $r_1^2$. The orientation vectors of the liquid crystal layer 2b, on the other hand, are illustrated in FIGS. 4(C) and 4(D) wherein the alignment layer 5c has a vector $r_2^1$. The tilt angle $\Delta\theta$ is within the range of 2°–3°.

With such an arrangement, the good display contrast areas of the two liquid crystal layers 2a and 2b are located in the region 12 as defined by the hatch lines and therefore in agreement with each other.

Figure 5:
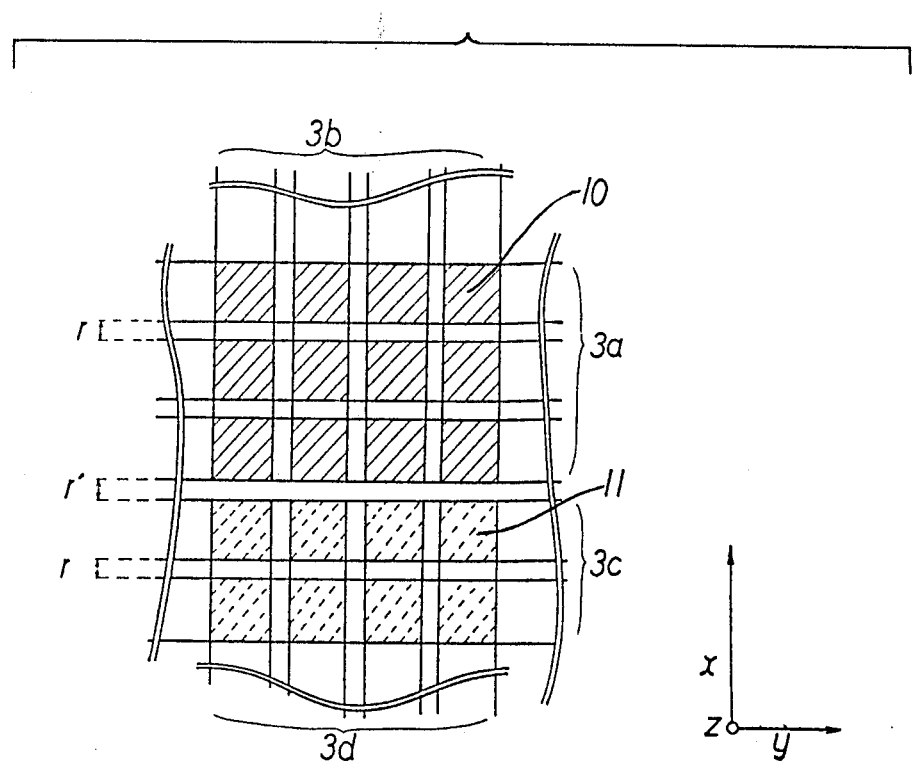
FIG. 5 is a schematic diagram of an electrode structure of the display device of FIG. 1.

FIG. 5 shows a schematic diagram of an electrode structure of the above illustrated two-layered liquid crystal display panel, wherein a display division 10 is defined by the electrode groups 3a and 3b and another display division 11 by the electrode groups 3c and 3d. When being viewed from the normal direction (Z direction), the distance (r') between the two adjacent display divisions along the X axis is equal to the distance (r) within the same display division.

Figure 6:
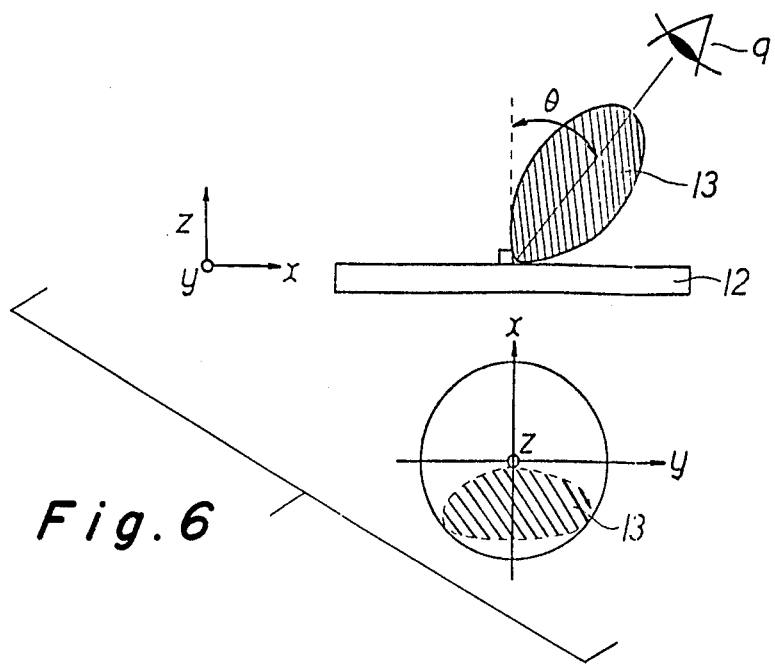

In the case where the twisted nematic field effect mode display cell 12 is driven in a multiplexing manner as shown in FIG. 6, the good display contrast area 13 is confined in a viewing angle region remote from the specific Z axis direction or the normal line direction. When the display panel as shown in FIGS. 1 and 5 is observed from the angle $\theta$ of FIG. 6, the substantial distance $r_o'$ of the display divisions 10 and 11 depends on the viewing angle $\theta$ because of the optical thickness l of the plate 16 being finite. For example, as indicated in FIG. 7, $r_0' < r$, $r_0' = r$ and $r_0' > r$ when $-\theta_0 < \theta < 0$, $\theta = 0$ and $\theta > 0$, respectively. The display divisions 10 and 11 overlap with each other in the case that $\theta < -\theta_0$. More particularly, when $\theta > 0$ and the display panel of FIG. 7 is observed at the viewing angle $\theta$ as shown in FIG. 6, $r_0' > r$ indicating that the distance $r_0'$ between the two adjacent display areas 10 and 11 differs from the distance r within the same display division, with the result of a visual display of a "strange line".

According to the above illustrated embodiment of the present invention, the transparent electrodes 3a, 3b, 3c and 3d are determined such that the respective display areas of the liquid crystal layers do not overlap with each other and the X axis distance $r_0'$ between the two adjacent imaging divisions is substantially equal to the X axis direction r within the same display division or $\gamma > r_0$ when the liquid crystal cell is observed from the good display contrast area.

While in an embodiment shown in FIG. 8 the display divisions 10 and 11 overlap with each other when being seen from the normal line direction and the direction of $\theta < 0$, the threshold voltage level of the electro-optical effects within the area where $\theta < 0$ or $\theta = 0$ is higher than that within the area where $\theta > 0$, causing no difference in display contrast. It goes without saying that the present invention is also applicable to liquid crystal display panels having three or more liquid crystal layers.

Whereas the present invention has been described with respect to specific embodiments thereof, it will be understood that various changes and modifications will be suggested to one skilled in the art, and it is intended to encompass such changes and modifications as fall within the scope of the appended claims.

What is claimed is:

1. A matrix liquid crystal display having a substantially planar display area and an intended viewing position $\theta°$ from a line normal to said planar display in a viewing direction along said planar display area where $\theta$ is greater than 0, said display comprising:
   at least two liquid crystal display layers, each of said liquid crystal display layers including,
      first and second substrates;
      a plurality of X electrodes aligned at given spaced intervals in a first direction of said first substrate,
      a plurality of Y electrodes aligned at given spaced intervals in a second direction normal to said first direction on said second substrate, and
      a layer of liquid crystal material having molecules extending spirally between said substrates and disposed between said plurality of X electrodes and said plurality of Y electrodes, said molecules each having a direction of twist from the furthest substrate to the closest substrate as seen from the intended viewing position,
   said plurality of X electrodes and said plurality of Y electrodes overlapping to form electric field responsive operating regions arranged in rows;
   said first and second substrates of each liquid crystal display area being molecularly aligned in directions substantially orthogonal to each other and collinear to the alignment directions of the respective substrates of said other liquid crystal display layers and defining first and second alignment vectors, said first and second alignment vectors defining a vector quadrant when extending from a single point, the viewing direction of said display being located in a quadrant adjacent to said vector quadrant in the direction opposite the direction of twist.

2. A matrix liquid crystal display according to claim 1 wherein said liquid crystal layers include the same liquid crystal material with substantially the same thickness.

3. The matrix display of claim 1 wherein the liquid crystal molecules have a tilt angle of 2 to 3 degrees.

4. The matrix display of claims 1 or 3 wherein said liquid crystal display layers are stacked so that said electric field operating regions of the respective liquid crystal display layers do not substantially overlap so that they may be viewed as a single display area;
   said liquid crystal display layers each having an edge row of electric field operating regions adjacent the electric field operating regions of an adjacent stacked liquid crystal display layer;
   the distance between adjacent electric field operating edge rows as perceived from said intended viewing position being less than or equal to the distance between adjacent rows of electric field operating regions within the same row.

5. A matrix liquid crystal display having a substantially planar display area and an intended viewing position $\theta°$ from a line normal to said planar display in a viewing direction along said planar display area where $\theta$ is greater than 0, said display comprising:
   at least two liquid crystal display layers, each of said liquid crystal display layers including,
      a plurality of X electrodes aligned at given spaced intervals in a first direction,
      a plurality of Y electrodes aligned at given spaced intervals in a second direction normal to said first direction, and
      a layer of liquid crystal material disposed between said plurality of X electrodes and said plurality of Y electrodes,
   said plurality of X electrodes and said plurality of Y electrodes overlapping to form electric field responsive operating regions arranged in rows;
   said liquid crystal display layers being stacked so that said electric field operating regions of the respective liquid crystal display layers do not substantially overlap so that they may be viewed as a single display area;
   said liquid crystal display layers each having an edge row of electric field operating regions adjacent the electric field operating regions of an adjacent stacked liquid crystal display layer;
   the distance between adjacent electric field operating edge rows as perceived from said intended viewing position being greater than zero and less than or equal to the distance between adjacent rows of electric field operating regions within the same row.

* * * * *